United States Patent [19]

Chipman et al.

[11] 4,349,054
[45] Sep. 14, 1982

[54] METHOD AND APPARATUS FOR SAFELY DESTROYING AEROSOL CONTAINERS

[75] Inventors: Donald M. Chipman, Memphis; Ray D. Bales, Millington, both of Tenn.

[73] Assignee: Plough, Inc., Memphis, Tenn.

[21] Appl. No.: 216,094

[22] Filed: Dec. 15, 1980

[51] Int. Cl.³ .......................... B65B 3/04; B67B 7/24
[52] U.S. Cl. ......................................... 141/1; 141/98; 141/168; 141/330; 222/80; 222/87; 222/152
[58] Field of Search .......................... 55/444; 100/902; 137/377; 141/1, 18, 51, 89-92, 97, 98, 165, 168, 180, 283, 329, 330, 311 R, 392; 222/152, 87, 88, 83, 835, 80

[56] References Cited

U.S. PATENT DOCUMENTS

| | | | |
|---|---|---|---|
| 3,303,968 | 2/1967 | Compere | 222/82 |
| 3,333,735 | 8/1967 | Odasso | 222/5 |
| 3,340,671 | 9/1967 | Loo | 141/329 X |
| 3,438,548 | 4/1969 | Ceyba | 222/80 |
| 3,601,164 | 8/1971 | Bruce | 141/329 X |
| 3,610,594 | 10/1971 | Williams | 263/15 |
| 3,828,976 | 8/1974 | Sidelinker | 222/83.5 |
| 3,961,922 | 6/1976 | Leung | 55/444 |
| 3,993,221 | 11/1976 | Boynton et al. | 222/87 |
| 4,166,481 | 9/1979 | Farris et al. | 141/1 |

Primary Examiner—Frederick R. Schmidt
Attorney, Agent, or Firm—Warrick E. Lee, Jr.; Vincent H. Gifford; Bruce M. Eisen

[57] ABSTRACT

Method and apparatus for safely destroying aerosol containers are disclosed. The movement of the container is restrained. Inert media is disposed about a point of puncture, and the container is punctured at the point of puncture.

19 Claims, 3 Drawing Figures

METHOD AND APPARATUS FOR SAFELY DESTROYING AEROSOL CONTAINERS

BACKGROUND

This invention relates to method and apparatus for safely destroying aerosol containers, containing flammable propellants, particularly aerosol containers commonly used to dispense suntan lotion, paint, antiseptic, hairspray, deodorant and the like. During manufacture, some aerosol containers are found to be incorrectly filled or leaking and must be destroyed. Returned or defective merchandise is another source of aerosol containers requiring destruction.

Defective aerosol containers are a real problem. As their numbers increase, they occupy large amounts of storage space. Yet the prior art does not provide a method for safely and economically destroying them in large quantities.

Destruction of aerosol containers by incineration or crushing presents obvious safety hazards. Furthermore, use of flammable propellents instead of the non-flammable, but environmentally unacceptable, florocarbons increases the hazards associated with destroying pressurized containers. Prior art, such as disclosed in U.S. Pat. Nos. 3,303,968; 3,333,735; 3,438,548; and 3,828,976; is capable of destroying, that is, puncturing, one container at a time with hand operated equipment. However this art cannot economically destroy large quantities of containers, nor can if safely destroy containers containing flammable propellent.

The present invention provides method and apparatus for safely destroying aerosol containers despite their flammable contents. The flammable propellents will not ignite dispite sparks that can be produced when the can is punctured. Preferred embodiments enable recovery of unused product and automatic operation for economically handling large quantities of containers. The operator of the apparatus is not exposed to flammable or noxious vapors.

SUMMARY OF THE INVENTION

The present invention comprises a process for safely destroying an aerosol container containing flammable propellent comprising the steps of:
  a. restraining movement of said container,
  b. disposing inert media around a point of puncture on said container, and
  c. puncturing said container at said point of puncture.

Preferably an inert media holder, purged with inert media, is disposed around the point of puncture. At least a portion of the aerosol container's contents can be conveyed to a location remote from the point of puncture. The process can be performed within an enclosure within which the concentration of propellent is maintained below its lower explosive limit.

A second aspect of the invention comprises apparatus for safely destroying an aerosol container containing flammable propellent comprising:
  a. means for restraining movement of said aerosol container,
  b. puncturing means adapted to penetrate said aerosol container at a point of puncture while the movement of said aerosol container relative to said restraining means is restrained, and
  c. means for providing inert media to said point of puncture during penetration.

The term "inert media" as used throughout the present specification and claims means a fluid substance that will prevent ignition of the aerosol container's flammable contents. Preferable inert media include nitrogen, carbon dioxide, argon, and water.

DETAILED DESCRIPTION OF THE INVENTION

Figure 1:
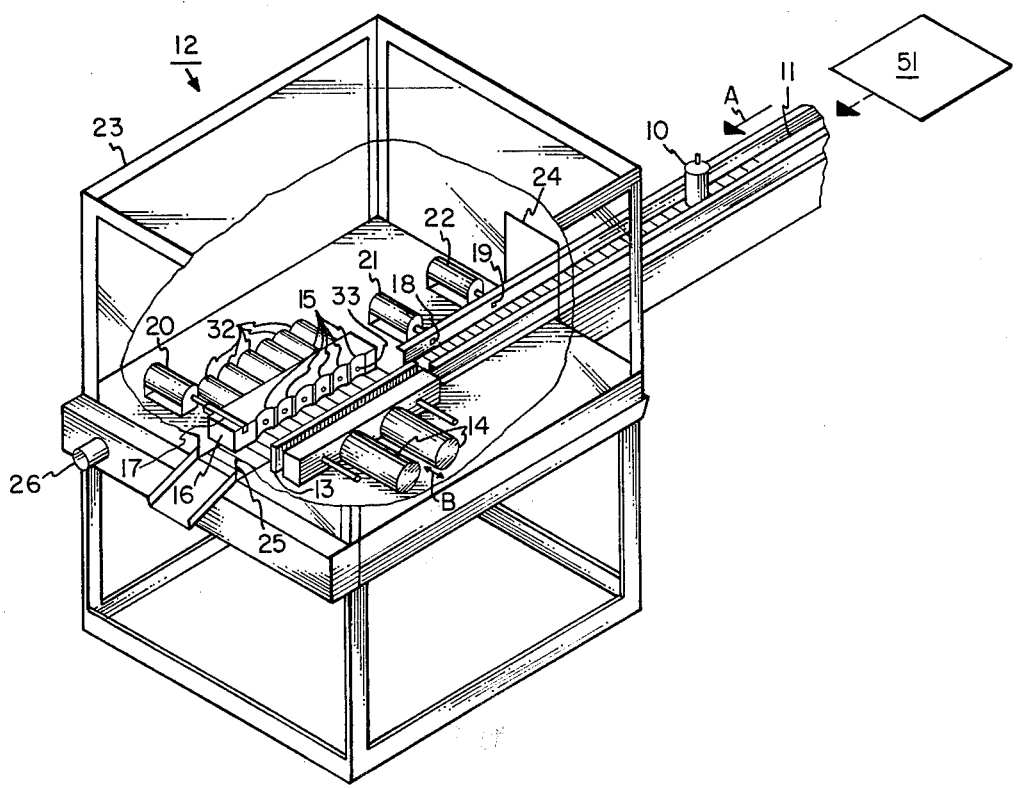
FIG. 1 is an isometric view of apparatus for destroying aerosol containers.
Figure 2:
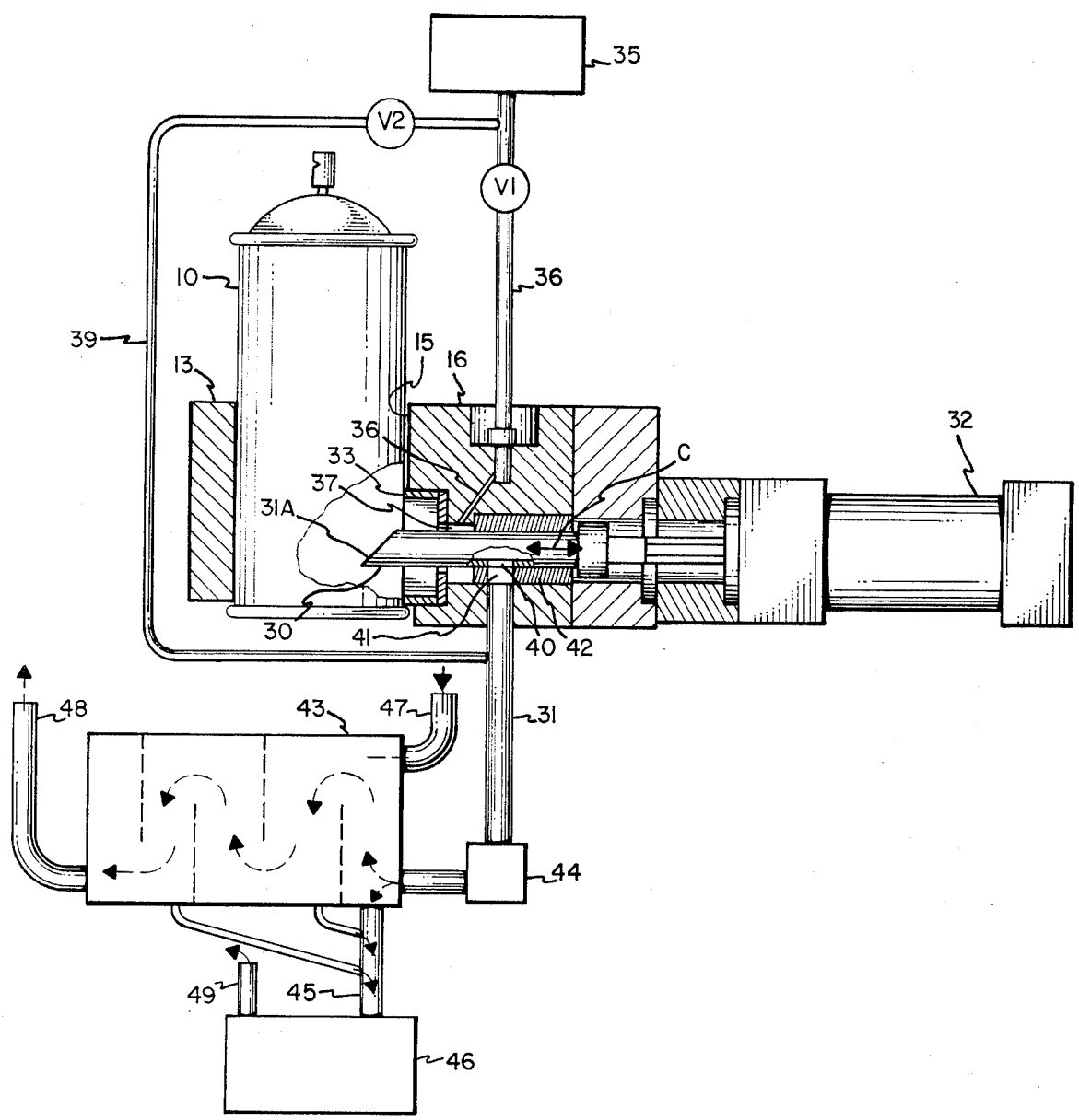
FIG. 2 is a schematic partial sectional view illustrating details of FIG. 1 and a product recovery means.

With reference to FIGS. 1 and 2, there is shown preferred apparatus for automatically destroying large quantities of aerosol containers. Containers 10 are fed by conveyor 11 in the direction of arrow A into apparatus 12.

Means for restraining movement of the containers comprising block 13 mounted for reciprocal movement in the direction of arrow B, is provided. Air cylinders 14 provide the reciprocating motion to block 13. Of course any other device suitable for restraining movement of the containers will suffice. Concave slots 15 for receiving the containers are provided in block 16, mounted opposite block 13.

Bars 17,18, and 19 can be reciprocated by air cylinders 20,21, and 22 in a direction parallel to arrow B. When extended, these bars can temporarily block the flow of containers along conveyor 11, as described in detail later.

Preferably the apparatus has an enclosure 23 having container inlet opening 24 and container outlet opening 25. Exhaust opening 26 on enclosure 23 is connected to the suction of an exhaust fan, not shown, and vented to a remote location. Constructing enclosure 23 of clear plastic allows visual observation of the puncturing operation.

The apparatus of FIG. 1 functions as follows. Containers to be destroyed are placed on conveyor 11 which feeds them into apparatus 12 through opening 24 in enclosure 23. In this case the apparatus is capable of handling 6 cans at a time. Hence bars 18 and 19, activated by air cylinders 21 and 22 automatically segregate 6 cans and allow them to be conveyed to conveyor 11 into position between blocks 13 and 16. The automatic sequencing machinery used to operate the invention can be designed by those skilled in the art. Bar 17 activated by air cylinder 20 prevents the containers from leaving the apparatus prematurely, that is, before movement of the containers is restrained by block 13 as described below.

When the required number of cans are positioned between blocks 13 and 16, air cylinders 14 cause block 13 to firmly press the container against concave slots 15. After the containers have been safely destroyed, as described in detail below with regard to FIG. 2, air cylinders 14 withdraw block 13 to release the containers. Bar 17 is withdrawn, and the containers leave the apparatus through opening 25.

During the entire operation, enclosure 23, which is provided to protect personnel from vapors that may leak from the cans, should be maintained at a low concentration of flammable propellant and other noxious gases. This may be accomplished by exhausting the enclosure through outlet 26. This outlet may be connected by a conduit, not shown, to an exhaust fan for blowing gases to a remote location. A constant flow of air through enclosure 23 prevents gases from the containers from escaping into the area around the enclosure and maintains the concentration of flammable propellent in the enclosure below its lower explosive limit. The rate of exhaust through outlet 26 depends upon the type of propellent used, the geometry of the enclosure, and the rate of leakage from the containers. Alternate means for maintaining the concentrations of flammable propellent in the enclosure below a lower explosive limit may be provided. For example, openings 24 and 25 could be sealed closed by sliding doors during puncturing, while the enclosure is purged with inert gas. Sliding doors would not be necessary if the flow of inert gas were high enough.

While the containers are held between blocks 13 and 16, they are depressurized and preferably at least partially emptied as best shown in FIG. 2. Identical elements of FIGS. 1 and 2 have identical reference numerals. A puncturing means located in block 16 comprises a penetrating member 30 for penetrating containers at a point of puncture. A conduit 31 leads from the point of puncture to a location remote from the puncturing means. Penetrating member 30 is preferably a punch with a hollow portion 31A open on its penetrating end forming an inlet to conduit 31. The punch is mounted for reciprocal movement in the direction of arrow C, with air cylinder 32 providing the motion.

When punch 30 is moved to the left in FIG. 2, as shown, a hole 40 in the punch aligns with a hole 41 in sleeve 42 surrounding punch 30, thereby opening conduit 31 over its full length. When punch 30 moves to the right in FIG. 2, conduit 31 is closed by punch 30 covering hole 41 in sleeve 42.

A key feature of the process is the step of disposing inert media around the point of puncture to prevent sparks from igniting the flammable propellent. The sparks could be formed by the metal-to-metal contact of puncturing. Preferably inert media is disposed around the point of puncture with a purged inert media holder. In FIG. 2, inert media holder 33, comprises a cup shaped member made of an elastmeric material such as soft rubber. Block 13 causes inert media holder 33 to abut against a portion of the surface of the aerosol container, thereby forming an enclosure around the point of puncture. Alternately, the inert media holder could be a strip of elastomer glued to concave slot 15, wherein the strip has a hole at the point of puncture. Preferably the inert media holder encloses only a portion of the surface of the container. This permits much faster feeding and discharging of the containers with less expensive apparatus, than would be possible if the inert media holder surrounded the entire can. Yet the place where ignition can take place, the point of puncture, is still protected.

Inert media, e.g. nitrogen gas, may flow from inert media source 35 through valve V1, through conduit 36, through annular space 37 around hollow punch 30, and into inert media holder 33.

Valve V2 may be used for controlling the flow of inert gas to the product recovery system (described later) through conduit 39.

Conduit 31 leads to a means for separating propellent and product. The separating means may be a baffle chamber 43 or any other device useful for separating gassified propellent from the particular liquid or solid product. Hence a cyclone, bag house, settling chamber, and so on would be acceptable. If the apparatus is capable of processing more than one container at a time, multiple conduits 31 may lead to a manifold 44, which then conducts the containers' contents to baffle chamber 43. Conduit 45 may lead recovered product to product receiver 46.

For safety it is preferable to maintain a flow of air through baffle chamber 43. The air enters through inlet 47 and exits through outlet 48, which is connected to the suction of an exhaust blower, not shown. Product receiver 46 may be vented to the atmosphere through outlet 49. It is also preferable to electrically ground members of the apparatus that contact flammable materials, such as punch 30, conduit 31, etc.

The apparatus of FIG. 2 functions as follows. Keep in mind that it is preferable to control the apparatus automatically by sequencing equipment known in the art of automatic process control.

Before start-up, valve V2 opens to purge the product recovery system with inert gas. After purging, with punch 30 moved to the right in FIG. 2, containers to be punctured are gripped between blocks 13 and 16 as described previously for FIG. 1. This causes inert media holder 33 to be disposed around the point of puncture of container 10. To empty a major portion of the container's product, it is preferable that the point of puncture be close to the bottom of the container. Locating the point of puncture on the bottom of the can by vertical arrangement of the puncturing apparatus is also acceptable and would provide maximum product recovery.

After inert media holder 33 is disposed around the point of puncture, valve V1 opens, purging inert media holder 33 with inert gas. Next air cylinder 32 moves punch 30 to the left, puncturing the can and simultaneously opening conduit 31 by aligning holes 40 and 41. Product and propellent, propelled by the pressure in the can, then flow through conduit 31, through holes 40 and 41, to manifold 44, into baffle chamber 43. The heavier product separates from the propellent and flows by gravity through conduit 45 to product receiver 46. The propellent, now in the gassious state flows from baffle chamber 43 through outlet 48. The material leaving the apparatus through conduit 48 may be safely disposed of by, for example, burning.

After container 10 has been destroyed, that is punctured, and at least partially emptied, air cylinder 32 withdraws punch 30 from container 10, valve V1 closes, block 13 is retracted, and the container may leave the apparatus. Since holes 40 and 41 move out of alignment, there can be no back flow into holder 33.

A preferred safety feature (not shown) that may be incorporated into apparatus having a conveyor belt to remove punctured cans is a stream of air directed as the cans as they leave the apparatus. The emptied cans, which are light in weight, may be blown by the air stream into an appropriate disposal container. However, it is possible for a can to pass through the apparatus unpunctured, because of, for example, failure of the air supply to the puncturing cylinder. The unpunctured can, which will be heavier than the emptied cans, will not be blown by the air stream into the disposal container. Instead, the unpunctured container can be conveyed to a separate container for recycling through the apparatus.

Figure 3:
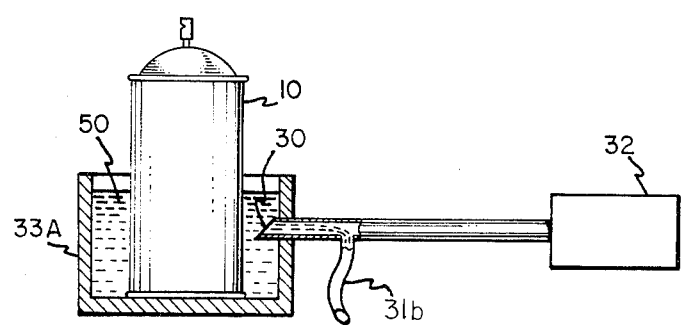
FIG. 3 shows an alternate embodiment of an inert media holder.

FIG. 3 shows an alternate embodiment of an inert media holder. Here the bottom of can 10 is disposed within a bath 33A containing liquid inert media 50, preferably water. Since the inert media holder of this embodiment is not pressure-tight, like the inert media container of FIG. 2, more propellent may escape to the enclosure, thereby necessitating a higher flow of air through the enclosure to keep the concentration of propellent below its lower explosive limit. Flexible conduit 31B conducts product from hollow punch 30 to a location remote from the point of puncture. In this case the inert media holder itself, which retains its inert media by gravity is its own means for purging itself with inert media.

The prefered apparatus in FIGS. 1 and 2 has several advantages over conventional methods of destroying aerosol containers. The operator is not exposed to noxious or flammable materials from the container. The inert media surrounding the point of puncture prevents ignition of flammable propellent, even if a spark is produced by the metal-to-metal contact of the punch with the container during puncturing. The product from the container may be collected and recovered. The automated apparatus is capable of economically handling large quantities of containers at high rates with very little labor.

Operation of the present apparatus in conjunction with a container filling line is envisioned. The containers would be filled with propellent and product in a conventional can filling line shown schematically by block 51 in FIG. 1. Conventional quality control procedures would also be performed on can filling line 51. A determination of which filled containers are leaking, underfilled, overfilled or otherwise do not meet specifications would be made. The off-specification containers would be separated from those meeting specification in conventional line 51, and the off-specification containers would be fed on to conveyor 11 of FIG. 1 for processing in the apparatus as described previously. Of course performing as many steps as practical automatically would be desirable.

What is claimed is:

1. A process for safely destroying an aerosol container containing flammable propellent comprising the steps of:
    a. restraining movement of said container,
    b. disposing and holding inert media that will prevent ignition of the aerosol containers flammable propellant around a point of puncture on said container, and
    c. puncturing said container at said point of puncture.

2. The process of claim 1 wherein step b. is performed by disposing an inert media holder around said point of and purging said holder with inert media.

3. The process of claim 2 further comprising
    d. conveying at least a portion of the contents of said aerosol container to a location remote from said point of puncture.

4. The process of claim 3 further comprising disposing said aerosol container in an enclosure during puncture and maintaining the concentration of flammable propellent within said enclosure below a lower explosive limit.

5. The process of claim 3 performed simultaneously on a plurality of aerosol containers.

6. The process of claim 5 wherein said aerosol containers contain product further comprising separating product and propellent conveyed from said container.

7. A process for filling aerosol containers and destroying off-specification containers comprising:
    (1) filling aerosol containers with flammable propellent and product,
    (2) determining which filled containers do not meet specifications,
    (3) separating off-speculation containers from containers meeting specification, and
    (4) destroying said off-speculation containers by the process of claim 1.

8. Apparatus for safely destroying an aerosol container containing flammable propellent comprising:
    a. means for restraining movement of said aerosol container,
    b. puncturing means adapted to penetrate said aerosol container at a point of puncture while the movement of said aerosol container relative to said restraining means is restrained,
    c. means for providing inert media that will prevent ignition of the aerosol containers flammable propellant to said point of puncture during penetration, and
    (d) wherein the element c inert media means comprises an inert media holder adapted to hold inert media around said point of puncture during penetration.

9. The apparatus of claim 8 including means for purging said inert media holder with inert media.

10. The apparatus of claim 9 further comprising a conduit adapted to conduct at least a portion of said aerosol container's contents to a location remote from said puncturing means.

11. The apparatus of claim 10 wherein said element b puncturing means is a punch having a hollow portion open on a penetrating end, said opening forming an inlet to said conduit.

12. The apparatus of claim 11 wherein said element b. puncturing means is adapted to puncture the aerosol container on or near its bottom, thereby conducting the major portion of said container's contents to a location remote from said puncturing means.

13. The apparatus of claim 11 further comprising
    e. an enclosure to enclose said aerosol container during penetration, and
    f. means for maintaining the concentration of flammable propellent in said enclosure below a lower explosive limit.

14. The apparatus of claim 11 adapted to simultaneously destroy a plurality of aerosol containers,
    having element a. restraining means is adapted to restrain movement of a plurality of said aerosol containers,
    having a plurality of element b puncturing means,
    having a plurality of element c inert media means,
    wherein said conduit is adapted to conduct at least a portion of a plurality of said containers' contents to a location remote from said puncturing means.

15. The apparatus of claim 14 further comprising means for automatically feeding and discharging aerosol container to and from said element a. restraining means.

16. The apparatus of claim 15 wherein said aerosol container contains propellent and product, wherein said conduit is adapted to conduct said propellent and product to means for separating propellent and product.

17. The apparatus of claim 8 in combination with an aerosol can filling line.

18. The apparatus of claim 8 wherein said element c. inert media means comprises an enclosure adapted to enclose only a portion of the surface of said container including said point of puncture during penetration, and means for purging said enclosure with inert media during penetration.

19. The apparatus of claim 8 wherein said element c. inert media means is a water bath adapted to surround said point of puncture with water during penetration.

\* \* \* \* \*